（12) United States Patent
Costa et al.

(10) Patent No.: US 8,470,444 B2
(45) Date of Patent: Jun. 25, 2013

(54) WATER DISPERSIBLE POLYISOCYANATE COMPOSITIONS

(75) Inventors: Gabriele Costa, Novate Milanese (IT); Mauro Mapelli, Bisuschio (IT); Giuseppe Li Bassi, Gavirate (IT)

(73) Assignee: Lamberti SpA, Albizzate (IT)

( * ) Notice: Subject to any disclaimer, the term of this patent is extended or adjusted under 35 U.S.C. 154(b) by 545 days.

(21) Appl. No.: 12/670,626

(22) PCT Filed: Jul. 23, 2008

(86) PCT No.: PCT/EP2008/059663
§ 371 (c)(1),
(2), (4) Date: Jan. 25, 2010

(87) PCT Pub. No.: WO2009/013316
PCT Pub. Date: Jan. 29, 2009

(65) Prior Publication Data
US 2010/0209714 A1  Aug. 19, 2010

(30) Foreign Application Priority Data
Jul. 26, 2007 (IT) .............................. VA2007A0066

(51) Int. Cl.
*B32B 27/40* (2006.01)
*C09K 3/00* (2006.01)
*C08L 75/04* (2006.01)
*C09J 175/04* (2006.01)

(52) U.S. Cl.
USPC ............. 428/423.1; 428/423.4; 428/425.5; 428/425.8; 428/425.9; 252/182.14; 524/589

(58) Field of Classification Search
USPC .......... 428/423.4, 425.5, 425.8, 425.9, 423.1; 252/182.14; 524/589
See application file for complete search history.

(56) References Cited

U.S. PATENT DOCUMENTS

| | | | |
|---|---|---|---|
| 7,358,294 B2 * | 4/2008 | Buckmann et al. | 524/507 |
| 7,582,698 B2 * | 9/2009 | Lubnin et al. | 524/589 |
| 8,188,171 B2 * | 5/2012 | Bernard et al. | 524/123 |
| 2006/0167204 A1 * | 7/2006 | Alanzo et al. | 528/44 |

* cited by examiner

*Primary Examiner* — Thao T. Tran
(74) *Attorney, Agent, or Firm* — Mossman Kumar & Tyler PC

(57) ABSTRACT

Non aqueous water dispersible compositions comprising: I) polyisocyanates, which are made hydrophilic by reaction with a 1,3- or 1,2-nonionic diol containing one alkoxy-terminated polyoxyethylene and/or polyoxypropylene chain, II) one or more ethoxylated alcohol phosphates having at least one phosphoric group in acid form, and optionally III) a water miscible organic solvent, the compositions being useful as crosslinker for polyurethane aqueous dispersions.

17 Claims, No Drawings

WATER DISPERSIBLE POLYISOCYANATE COMPOSITIONS

TECHNICAL FIELD

The present invention relates to non aqueous water dispersible compositions comprising: I) polyisocyanates which are made hydrophilic by reaction with a 1,3- or 1,2-nonionic diol containing one alkoxy-terminated polyoxyethylene and/or polyoxypropylene chain, and II) one or more ethoxylated alcohol phosphates having at least one phosphoric group in acid form.

The compositions of the invention are useful in particular as crosslinkers for aqueous polyurethane dispersions to prepare coatings for leather, paper, paperboard, plastics and metals and for the preparation of adhesives, printing pastes and textile and fibres impregnating agents.

BACKGROUND ART

The use of hydrophilic polyisocyanate crosslinkers in the leather, adhesives, paints and varnishes fields has been known for a long time.

Generally, emulsifiable or water dispersible polyisocyanate compositions are co-formulated shortly before use with other products, mainly with aqueous polyurethane or polyacrylate aqueous dispersions and/or emulsions, and applied on the item which is to be treated.

Emulsifiable polyisocyanates, in fact, react by means of their isocyanate groups with the active hydrogens of the polymers and eventually of the item itself, thus generating a crosslinking which renders the film highly resistant.

Many patents describe the preparation and use of water dispersible polyisocyanates which are useful as crosslinkers.

By way of example, U.S. Pat. No. 4,663,377 describes water dispersible polyisocyanate compositions comprising a water emulsifiable polyisocyanate obtained from the reaction of an aliphatic polyisocyanate with a nonionic polyether alcohol containing oxyethylene units; U.S. Pat. No. 4,663,377 does not describe the use of 1,3- or 1,2-nonionic diol containing one alkoxy-terminated polyoxyethylene chain as the polyether alcohol.

U.S. Pat. No. 5,583,176 refers to water-emulsifiable polyisocyanates obtained from the reaction of polyisocyanates with compounds containing a sulphonic group (or anion thereof) and a functional group capable of reacting with the isocyanate groups; among these compounds the use of a 1,3-sulphonated diol containing one oxyethylene chain is cited, but without attributing to it particular advantages.

U.S. Pat. No. 5,852,111 describes polyisocyanate compositions comprising hydrophilic polyisocyanates and an ionic surfactant; in the patent only ionic surfactants in the form of salts are used; non ionized surfactants in acid form are never discussed.

In our patent application EP 1 567 574 stable aqueous dispersions of blocked polyisocyanates are described which have been obtained from the reaction of a polyisocyanate, a blocking agent and 1,3- or 1,2-nonionic diols, together with their use in the preparation of textile finishing agents.

The scope of the present invention is to provide non aqueous stable compositions comprising non-blocked nonionic hydrophilic polyisocyanates useful as crosslinkers for water dispersed polymers, particularly for polyurethanes, and capable of forming films having high mechanical and chemical resistance, good adhesion especially on leather and skins, together with high transparency.

It is a further object of the present invention to provide compositions comprising non-blocked non-ionic hydrophilic polyisocyanates which are readily dispersible in water and are as stable as it is adequate for industrial use.

DISCLOSURE OF INVENTION

It has now been found that compositions containing: i) from 30 to 99% by weight of one or more nonionic hydrophilic polyisocyanates obtained from the reaction of a) aliphatic or cycloaliphatic polyisocyanates containing from 3 to 10 isocyanate groups per molecule; b) at least one 1,3- or 1,2-nonionic diol containing a single alkoxy-terminated polyoxyethylene and/or polyoxypropylene chain; ii) from 1 to 20% by weight and preferably from 5 to 15% by weight, of one or more ethoxylated alcohol phosphates in acid form iii) from 0 to 50% by weight, and preferably from 5 to 30% by weight, of an organic solvent that is miscible with water.

The ethoxylated alcohol phosphates in acid form useful for the realization of the present invention have the following general formula:

$$[RO-(CH_2CH_2O)_s]_t P(=O)-(OH)_{3-t}$$

wherein R is saturated or unsaturated, linear or branched alkyl group having from 4 to 20 carbon atoms, s is a number from 2 to 20, t is 1 or 2.

The acid form of the ethoxylated alcohol phosphate of the compositions is necessary to increase the stability (pot-life) and to reduce the particle dimensions of the water dispersions that can be prepared from the compositions of the present invention and allows to obtain particle diameters below 200 nm and film showing remarkable transparency.

Particularly useful for the realization of the invention are the above described ethoxylated alcohol phosphates having surfactant properties, in particular the ethoxylated alcohol phosphates in which R is a saturated, linear or branched alkyl group having from 12 to 15 carbon atoms and s is a number from 4 to 10.

Among the 1,3- or 1,2-nonionic diols containing a single alkoxy-terminated polyoxyethylene and/or polyoxypropylene chain which are useful for the realization of the present invention we cite diols having the following general formula:

$$R_1CH_2O\text{—}(CH_2CH_2O)n\text{—}(CH_2CHCH_3O)m\text{—}R_2 \quad (I)$$

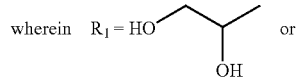

wherein $R_1 = HO$ or (II)

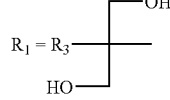

(III)

$R_2$ and $R_3$ may be the same or different from each other and are chosen among methyl, ethyl, n-propyl, i-propyl, n-butyl, i-butyl;

n is a number from 0 to 40;

m is a number from 0 to 40;

the sum n+m is a number from 20 to 80, preferably from 20 to 40.

The 1,3-diols of general formula (I)

wherein:

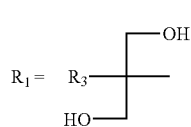

(III)

$R_2$ is methyl, $R_3$ is ethyl, n is from 15 to 30 and m is from 0 to 10 are preferred for the realization of the present invention; examples of such diols are Tegomer® D-3403 and Tegomer® D-3123, commercialized by Th. Goldschmidt AG.

The use of these diols optimizes the hydrophilicity, maximizing the dispersibility and the poly-fuctionality of the polyisocyanate.

The nonionic hydrophilic polyisocyanates of the present invention contain from 1 to 25% by weight, preferably from 3 to 15% by weight, of polyoxyethylene and/or polyoxypropylene chains deriving from the aforesaid 1,3- and/or 1,2-nonionic diols, and may further contain up to 10% by weight of polyoxyethylene and/or polyoxypropylene chains deriving from the reaction of a polyisocyanate with other ethoxylated and/or propoxylated alcohols, such as, by way of example, the ethoxylated and/or propoxylated derivatives of methanol, n-butanol, cyclohexanol, 3-methyl-3-hydroxymethyloxyethane, ethylene glycol, propylene glycol, glycerol and trimethylolpropane, and mixtures thereof.

Examples of polyisocyanates that can be used for the realization of the invention are the compounds obtained from trimerization, biurethization, urethanization or allophanation of polyisocyanates, such as hexamethylendiisocyanate, isophoronediisocyanate, 4,4'-dicyclohexylmethanediisocyanate and mixtures thereof.

The preferred polyisocyanate is the isocyanurate from hexamethylenediisocyanate.

According to a preferred embodiment, the compositions of the invention consists of i), ii) and iii).

The organic solvent which is miscible with water shall not react with the isocyanate groups; preferably the solvent is a ketone, an amide, a lactone, a lactame, a cyclic or alicyclic ether, an ester, a linear or cyclic carbonate, or a mixture thereof; more preferably the solvent is chosen among acetone, ethyl methyl ketone, cyclohexanone, dimethylamides from acids, 1,3-dioxolane, dibutylether, dimethyl, diethyl or dibutyl cellosolve, dimethyl, diethyl or dibutyl carbitol, propylene glycol dimethyl, diethyl or dibutyl ether, dipropylene glycol dimethyl ether, dipropylene glycol monomethyl ether acetate, propylene glycol monomethyl ether acetate, dimethoxymethane, methyl ester of adipic or succinic acid, ethylacetate, butylacetate, methoxypropylacetate, glyoxal tetramethylacetal, propylene carbonate, diethyl carbonate, ethylpyrrolidone, methylpyrrolidone, and mixtures thereof.

The ethoxylated alcohol phosphates in acid form useful for the present invention show good compatibility with the hydrophilic polyisocyanate, the solvent and the oxyethylene chains, also when in anhydrous form.

It is therefore possible to add the ethoxylated alcohol phosphates in acid form, in anhydrous form or with less than 1% of water, both during the synthesis of the polyisocyanate or at the end of the preparation, as described below.

The compositions of hydrophilic polyisocyanates of the present invention, when dispersed in water at concentrations between 1 and 10% by weight, are visually homogenous and do not show the formation of deposits even 24 hours after their dispersion, at room temperature; it can also be observed by titration (method ASTM D2572) that, in the same conditions, 6 hours after their dispersion in water, more then a half of the isocyanate groups are still present.

The high stability of the water dispersions obtained from the compositions of the present invention makes them especially suitable for use in industrial applications.

The preparation of the compositions comprises the following steps: A) reacting at a temperature between 30° and 120° C. one or more aliphatic or cicloaliphatic polyisocyanate containing from 3 to 10 isocyanate groups per molecule and at least one 1,3- or 1,2-nonionic diol containing a single alkoxy-terminated polyoxyethylene and/or polyoxypropylene chain, adjusting their equivalent ratio so that the obtained nonionic hydrophilic polyisocyanate contains from 1 to 25% by weight, preferably from 3 to 15% by weight, of polyoxyethylene and/or polyoxypropylene chains deriving from the 1,3- and/or 1,2-nonionic diol; B) diluting the thus obtained product with an organic solvent in order to prepare the hydrophilic nonionic polyisocyanate at a concentration from 30 to 99% by weight, preferably from 60 to 90% by weight in the final composition; the ethoxylated alcohols phosphates in acid form being indifferently mixed with the reagents of step A), or added to the mixture that is obtained at the end of step A), or present in the diluting solvent, or added at the end of step B), in such an amount that their concentration in the final composition is from 1 to 20% by weight, preferably from 5 to 15% by weight.

From the procedure of this invention non aqueous compositions of hydrophilic nonionic polyisocyanates that are stable for at least 6 months at room temperature are obtained.

The compositions obtained from the procedure of the invention can advantageously be used for the preparation of coatings for leather, paper, cardboard, plastic and metals, for the preparation of adhesives, printing pastes and impregnating agents for fabrics and fibres.

In the examples the following materials have been used:

Polyether 1=Tegomer® D-3403, ethoxylated diol according to the invention with a molecular weight of 1220 g/mol and a general formula I wherein $R_1$ is (III), $R_2$ is methyl, $R_3$ is ethyl, m=0; commercialized by Th. Goldschmidt AG.

Polyether 2=mono-hydroxy polyether obtained from ethoxylation of methanol, molecular weight 500 g/mol.

Polyisocyanate 1=Tolonate® HDT LV2, product from hexamethylenediisocyanate isocyanuration, with a content of isocyanate groups of 23.0±1%, dry content 100%; commercialized by Rhodia.

Polyisocyanate 2=Tolonate® HDB LV, product from hexamethylenediisocyanate biuretization, with a content of isocyanate groups of 23.0±1%, dry content 100%; commercialized by Rhodia.

Polyisocyanate 3=Desmodur® XP2410, product from hexamethylenediisocyanate isocyanuration, with a content of isocyanate groups of 24.0±1%, dry content 100%; commercialized by Bayer.

Surfactant 1=6 moles ethoxylated $C_{12}$-$C_{15}$ alcohol phosphate in acid form (% P=7.1; acidity No.=200-210).

Rolflex® D148=polyether based aliphatic polyurethane dispersion, 35% dry content, commercialized by Cesalpinia Chemicals, Italy.

Basonat® HW/PC=polyisocyanate cross-linker commercialized by BASF, Germany.

Example 1

82.458 g (135 meq) of Polyether 1 and 100 g of Surfactant 1 are loaded into a reactor equipped with mechanical stirrer, thermometer and condenser under nitrogen atmosphere at room temperature. The mixture is distilled under vacuum in order to reduce the residual water content to values below 0.05%, measured by Karl Fisher titration.

817.542 g (4406 meq) of Polyisocyanate 1 are loaded under stirring at a temperature of 40° C. under nitrogen atmosphere.

The mixture is then heated to 90° C. and maintained at 85-90° C. for approximately a hour, till the attainment of a isocyanate groups percentage value of 18% (determined in all the examples according to the method ASTM D2572).

A yellow clear liquid composition having Brookfield® viscosity at 25° C. of 3,200 mPa·s is obtained (Crosslinker 1).

Example 2

80 g of Crosslinker 1 are mixed with 20 g of dipropylene glycol dimethyl ether, commercialized by Dow Chemicals as Proglyde® DMM.

A composition with a Brookfield® viscosity at 25° C. of 550 mPa·s is obtained.

Example 3

80 g of Crosslinker 1 are mixed with 20 g of propylene carbonate, commercialized by BASF.

Example 4

80 g of Crosslinker 1 are mixed with 20 g of dibasic esters commercialized by DuPont as DBE-IB.

Example 5

80 g of Crosslinker 1 are mixed with 20 g of glyoxal tetramethylacetal.

Example 6

80 g of Crosslinker 1 are mixed with 20 g of a fatty acid dimethylamide, commercialized by Cognis as Agnique® KE 3308.

Example 7

80 g of Crosslinker 1 are mixed with 20 g of ethylpyrrolidone, commercialized by BASF.

Example 8

80 g of Crosslinker 1 are mixed with 20 g of propylene glycol diacetate, commercialized by Dow Chemicals as Dowanol® PGDA.

Example 9

Comparative 80 g of Crosslinker 1 are mixed with 20 g of dipropylene glycol dimethylether, commercialized by Dow Chemicals as Proglyde® DMM and with 3.4 g of triethylamine, in order to completely neutralize the ethoxylated alcohol phosphate (Surfactant 1).

Example 10

Comparative

Synthesis of a composition containing a hydrophilic polyisocyanate crosslinker, carried out in the presence of an ionic surfactant in salt form, according to U.S. Pat. No. 5,852,111.

Polyether 2 is mixed with a sodium dialkyl sulfosuccinate (ionic surfactant having 70% dry content, commercialized by Cesalpinia Chemicals as IMBIROL OT/NA/7) in a weight ratio, referred to the dry content, of 2:1.

The mixture is heated to 120° C. in order to distil off the residual water at a reduced pressure of 20 torr.

1000 g of Polyisocyanate 2 are added to 300 g of the mixture obtained from the distillation and the mixture is maintained at 90° C. for two hours.

A crosslinking composition with residual isocyanate groups percentage of 16.68% is obtained.

Example 11

42.186 g (69 meq) of Polyether 1 and 50 g of Surfactant 1 are loaded at room temperature under nitrogen atmosphere in a reactor equipped with mechanical stirrer, thermometer and condenser. The mixture is distilled under vacuum in order to reduce the residual water content to values below 0.05%, measured by Karl Fisher titration. At a temperature of 40° C. under nitrogen atmosphere, 407.814 g of Polyisocyanate 2 (2255 meq) are added under stirring. The mixture is then heated to 90° C. and maintained at 85-90° C. for approximately a hour, till the percentage value of isocyanate groups is 18.3%. The resin is cooled and 125 g of Proglyde® DMM are added.

A clear yellow liquid composition having a viscosity at 25° C. of 530 mPas·s is obtained.

Example 12

Under nitrogen atmosphere and at ambient temperature, 34.366 g (563 meq) of Polyether, 1, 60 g of Surfactant 1 and 180 g of Proglyde® DMM are loaded into a reactor equipped with mechanical stirrer, thermometer and condenser. The mixture is distilled under vacuum in order to reduce the residual water content to values below 0.05%, measured by Karl Fisher titration. 325.634 g (1840 meq) of Polyisocyanate 3 are loaded under stirring at a temperature of 40° C. under nitrogen atmosphere. The mixture is then heated at 90° C. and maintained at a temperature of 85-90° C. for approximately an hour, till the attainment of the percentage value of isocyanate groups of 12.5%.

A clear liquid composition at room temperature with yellow colour having a viscosity at 25° C. of 440 mPa·s is obtained.

Example 13

Comparative 56.00 g (112 meq) of Polyether 2 and 100 g of propylene carbonate, commercialized by BASF are loaded under nitrogen atmosphere at room temperature in a reactor equipped with a mechanical stirrer, thermometer and condenser. The mixture is distilled under vacuum in order to reduce the residual water content values below 0.05%, measured by Karl Fisher titration. At a temperature of 40° C. in nitrogen atmosphere, 344.00 g (1860 millieq.) of Polyisocyanate 1 are added under stirring. The mixture is then heated to 90° C. and maintained at 85-90° C. for approximately a hour, till the attainment of a percent value of isocyanate groups of 16%.

A clear liquid resin with a viscosity at 25° C. of 370 mPa*s is obtained.

Example 14

Comparative 100 grams of the product obtained from Example 13 are mixed with 10 g of Surfactant 1 and 2.5 g of propylene carbonate.

Stability Test in Water.

The crosslinking compositions obtained from the above described Examples were dispersed in water under stirring at room temperature at a concentration of 3% referred to the polyisocyanate dry content.

After 24 hours the mean particle diameter of the dispersions (D) and the standard deviation (DS) was measured by means of a Coulter N4 Plus.

The results are reported in Table 1.

TABLE 1

| Crosslinking Composition | D (nm) | DS (nm) |
|---|---|---|
| Ex. 2 | 46.6 | 22.8 |
| Ex. 3 | 54.1 | 49.0 |
| Ex. 4 | 84.6 | 114.4 |
| Ex. 5 | 49.7 | 15.9 |
| Ex. 6 | 53.0 | 45.0 |
| Ex. 7 | 48.4 | 55.8 |
| Ex. 8 | 65.0 | 63.6 |
| Ex. 9* | 80.0 | 55.0 |
| Ex. 10* | 135.4 | 113.7 |
| Ex. 11 | 74.7 | 35.0 |
| Ex. 12 | 49.0 | 37.0 |
| Ex. 13* | 771.5 | 481.0 |
| Ex. 14* | 80.1 | 112.2 |

*comparative

Dispersibility Test in a Polyurethane Aqueous Dispersion.

The crosslinking compositions obtained from the above described Examples and a crosslinking agent available on the market are added to the polyurethane aqueous dispersion Rolflex® D148, commercialized by Cesalpinia Chemicals, at a crosslinker concentration of 3% (dry content), and the mixtures are stirred at room temperature The mixing time (T), i.e. the time in minutes which is needed to obtain a homogeneous dispersion, the pot life (PL) of the mixture, i.e. the time in hours taken by the mixture to become a non-pourable gel, and the appearance (A) of the 1 mm thick films obtained drying the dispersion (visual ranking: 1=perfectly transparent; 2=slightly opaque; 3=opaque) have been determined. The results are reported in Table 2.

TABLE 2

| Crosslinker Composition | T | PL | A |
|---|---|---|---|
| Ex. 2 | <1 | >120 | 1 |
| Ex. 3 | <1 | 72 | 1 |
| Ex. 4 | <1 | 100 | 2 |
| Ex. 5 | <1 | >120 | 1 |
| Ex. 6 | <1 | >120 | 1 |
| Ex. 7 | <1 | >120 | 1 |
| Ex. 8 | <1 | >120 | 1 |
| Ex. 9* | <1 | 24 | 2 |
| Ex. 10* | 5 | 3 | 2 |
| Ex. 11 | <1 | 24 | 2 |
| Ex. 12 | <1 | >120 | 1 |
| Ex. 13* | <1 | 6 | 3 |
| Ex. 14* | <1 | 12 | 2 |
| Basonat ® HW/PC* | 20 | 72 | 1 |

*comparative;

It can be observed that the dispersions obtained starting from the compositions according to the invention have short mixing times, high stability and give films with optimal transparency.

Applicative Test in Leather Finishing

A polyurethane dispersion for glossy fixatives commercialized by UNICHEM SpA, Nova 2090/03, is crosslinked with 3% of the product obtained from Example 2, or from Example 13 or with 3% of a crosslinker available on the market on a full grain base leather.

The Nova 2090/03 and crosslinker mixture is applied by spraying after 2 hours from its preparation and the surface of the leather is analyzed after 24 hours.

The pot life results of the mixtures (PL) and the wet rubbing test results measured according to ISO standard No. 11640 (WR) are reported in Table 3; as for the pot life, the zero value is attributed to the dispersion obtained with Basonat HW/PC; negative values indicate a worsening, positive values indicate an improvement (ranking: −2, −1, 0, +1, +2).

TABLE 3

| Crosslinking Composition | WR | PL |
|---|---|---|
| Ex. 13* | 110 | 0 |
| Ex. 2 | 190 | +2 |
| Basonat HW/PC* | 130 | 0 |

*comparative

Chemical Stability Test in Water 10 g of crosslinking composition are dispersed at room temperature in 90 g of water under mechanical stirring.

The initial % of —NCO groups (% to) is determined.

The dispersion are left standing at room temperature for 6 hours and the % of —NCO groups is determined again (% $t_{6h}$).

% $t_0$, % $t_{6h}$ and their difference (D %) are reported in Table 4.

TABLE 4

| Crosslinking composition | % $t_0$ | % $t_{6h}$ | D % |
|---|---|---|---|
| Ex. 2 | 1.11% | 0.94% | −15.30% |
| Ex. 13* | 1.52% | 0% | −100% |
| Ex. 10* | 1.36% | 0.84% | −15.90% |
| BASONAT HW/PC* | 1.26% | 1.06% | −38.20% |

The invention claimed is:

1. A non-aqueous compositions comprising:
   i) from about 30 to about 99% by weight of one or more nonionic hydrophilic polyisocyanates obtained from the reaction of:
      a) an aliphatic or cycloaliphatic polyisocyanates having from 3 to 10 isocyanate groups per molecule; and
      b) at least one 1,3- or 1,2-nonionic diol containing a single alkoxy-terminated polyoxyethylenic and/or polyoxypropylenic chain;
   ii) from about 1 to about 20% by weight of one or more ethoxylated alcohol phosphates in acid form having formula:

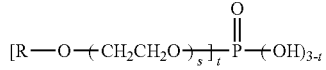

wherein:
      R is a saturated or unsaturated, linear or branched, alkyl group having from 4 to 20 carbon atoms, and s is an integer from 2 to 20, t is 1 or 2; and
   iii) from 0 to about 50% by weight of an organic solvent that is miscible with water.

2. The composition of claim 1 wherein the ethoxylated alcohol phosphate in acid form is present at a concentration of from 5 to 15% by weight.

3. The composition of claim 1 wherein R is a saturated, linear or branched, alkyl group, having from 12 to 15 carbon atoms.

4. The composition of claim 1 wherein s is an integer from 4 to 10.

5. The composition of claim 1 wherein the 1,3- or 1,2-nonionic diol containing a single alkoxy-terminated polyoxyethylenic and/or polyoxypropylenic chain has the general formula:

 (I)

$R_1CH_2O-(CH_2CH_2O)n-(CH_2CHCH_3O)m-R_2$ wherein

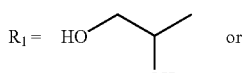 (II)

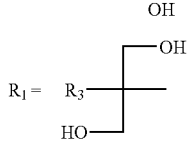 (III)

and:

R$_2$ and R$_3$ are the same or different and are chosen from the group consisting of methyl, ethyl, n-propyl, i-propyl, n-butyl, and i-butyl;
n is a number from 0 to 40;
m is a number from 0 to 40; and
the sum of n+m is an integer from 20 to 80.

6. The composition of claim 5 wherein the diol is a 1,3-diol having formula (I) wherein

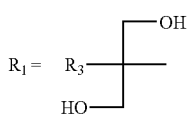 (III)

R2 is methyl, R3 is ethyl, n is from 15 to 30 and m is from 0 to 10.

7. The composition of claim 1 wherein the nonionic hydrophilic polyisocyanate contains from 1 to 25% by weight of polyoxyethylenic and/or polyoxypropylenic chains deriving from the 1,3- and/or 1,2-nonionic diol, and from 0 to 10% by weight of polyoxyethylenic and/or polyoxypropylenic chains deriving from the reaction of the polyisocyanate with ethoxylated and/or propoxylated alcohols selected from the group consisting of ethoxylated and/or propoxylated derivatives of methanol, n-butanol, cyclohexanol, 3-methyl-3-hydroxymethyloxy ethane, ethylene glycol, propylene glycol, glycerol, trimethylol propane, and mixtures thereof.

8. The composition of claim 7 wherein the nonionic hydrophilic polyisocyanate contains from 3 to 15% by weight of polyoxyethylenic and/or polyoxypropylenic chains deriving from 1,3- and/or 1,2-nonionic diols.

9. The composition of claim 1 wherein the nonionic hydrophilic polyisocyanate is a compound obtained from trimerization, biurethization, urethanization or allophanation of polyisocyanates.

10. The composition of claim 9 wherein the polyisocyanate that is subjected to trimerization, biurethization, urethanization or allophanation is selected from the group consisting of hexamethylendiisocyanate, isophoronediisocyanate, 4,4'-dicyclohexylmethanediisocyanate, and mixtures thereof.

11. The composition of claim 10 wherein the nonionic hydrophilic polyisocyanate is an isocyanurate obtained by the trimerization hexamethylendiisocyanate.

12. The composition of claim 1 wherein the organic solvent is chosen from the group consisting of: acetone, ethyl methyl ketone, cyclohexanone, dimethylamides from acids, 1,3-dioxolane, dibutylether, dimethyl, diethyl or dibutyl cellosolve, dimethyl, diethyl or dibutyl carbitol, propylene glycol dimethyl, diethyl or dibutyl ether, dipropylene glycol dimethyl ether, dipropylene glycol monomethyl ether acetate, propylene glycol monomethyl ether acetate, dimethoxymethane, methyl ester of adipic or succinic acid, ethyl acetate, butyl acetate, methoxypropyl acetate, glyoxal tetramethylacetal, propylene carbonate, diethyl carbonate, ethyl pyrrolidone, methylpyrrolidone, and mixtures thereof.

13. A polyurethane aqueous dispersion comprising the composition of claim 1 and a polyurethane.

14. The polyurethane aqueous dispersions of claim 13 wherein the composition of claim 1 functions as a crosslinker.

15. An article of manufacture prepared using a polyurethane aqueous dispersion comprising the composition of claim 1 and a polyurethane wherein the article of manufacture is a substrate coated with the polyurethane aqueous dispersion.

16. The article of manufacture of claim 15 wherein the substrate is selected from the group consisting of leather, paper, cardboard, plastic and metal.

17. An article of manufacture prepared by admixing a formulation comprising a polyurethane aqueous dispersion of claim 1 and a polyurethane wherein the article of manufacture adhesives has properties allowing it to be employed as adhesives, printing pastes, and impregnating agents for fabrics and fibers.

* * * * *